United States Patent
Homan et al.

(10) Patent No.: US 12,396,473 B2
(45) Date of Patent: Aug. 26, 2025

(54) DUAL-SPRAY REDUCED SUGAR COATING SYSTEM AND METHOD

(71) Applicant: Kellanova, Battle Creek, MI (US)

(72) Inventors: Eric Joseph Homan, Portage, MI (US); Tamila Rena Williams, Richland, MI (US); Gabriela Perez-Hernandez, Portage, MI (US)

(73) Assignee: KELLANOVA, Battle Creek, MI (US)

( * ) Notice: Subject to any disclaimer, the term of this patent is extended or adjusted under 35 U.S.C. 154(b) by 0 days.

(21) Appl. No.: 18/133,044

(22) Filed: Apr. 11, 2023

(65) Prior Publication Data
US 2023/0240349 A1      Aug. 3, 2023

Related U.S. Application Data

(62) Division of application No. 16/287,014, filed on Feb. 27, 2019, now Pat. No. 11,647,780.

(Continued)

(51) Int. Cl.
| | |
|---|---|
| *A23P 20/18* | (2016.01) |
| *A23G 3/20* | (2006.01) |
| *A23G 3/26* | (2006.01) |
| *A23G 3/34* | (2006.01) |
| *A23G 3/54* | (2006.01) |

(Continued)

(52) U.S. Cl.
CPC ............ *A23P 20/18* (2016.08); *A23G 3/0089* (2013.01); *A23G 3/0095* (2013.01); *A23G 3/2092* (2013.01); *A23G 3/26* (2013.01); *A23G 3/343* (2013.01); *A23G 3/54* (2013.01); *A23L 7/122* (2016.08); *A23L 7/191* (2016.08); *A23L 29/35* (2016.08); *B05C 5/02* (2013.01); *A23V 2002/00* (2013.01); *A23V 2250/5114* (2013.01); *A23V 2250/61* (2013.01); *A23V 2250/628* (2013.01)

(58) Field of Classification Search
None
See application file for complete search history.

(56) References Cited

U.S. PATENT DOCUMENTS

| | | | | |
|---|---|---|---|---|
| 2,576,952 A | * | 12/1951 | Edison | B05B 13/0221 |
| | | | | 118/304 |
| 4,499,113 A | | 2/1985 | Mochizuki et al. | |

(Continued)

FOREIGN PATENT DOCUMENTS

| | | |
|---|---|---|
| EP | 0586138 A2 | 3/1994 |
| EP | 0608950 A1 | 8/1994 |

(Continued)

OTHER PUBLICATIONS

PCT/US2019/019746 International Search Report dated May 29, 2019.

*Primary Examiner* — Jethro M. Pence
(74) *Attorney, Agent, or Firm* — Honigman LLP

(57) ABSTRACT

A system and method for applying a reduced sugar coating to a food product is provided. The system uses separate applications (simultaneous or sequential) of a non-sucrose carbohydrate syrup from a first applicator and a sucrose syrup from a second applicator. The dual applications of the syrups are applied without an active drying step between applications. The process results in a coated food product with reduced clumping and a desired crystallized appearance even with the reduced levels of sugar.

7 Claims, 1 Drawing Sheet

Related U.S. Application Data

(60) Provisional application No. 62/637,529, filed on Mar. 2, 2018.

(51) Int. Cl.
*A23L 7/122* (2016.01)
*A23L 7/191* (2016.01)
*A23L 29/30* (2016.01)
*B05C 5/02* (2006.01)

(56) References Cited

U.S. PATENT DOCUMENTS

| | | | | |
|---|---|---|---|---|
| 4,676,186 A | * | 6/1987 | Drainas | A47J 43/28 |
| | | | | 118/202 |
| 4,743,456 A | * | 5/1988 | Spadafora | A23P 20/15 |
| | | | | 239/222 |
| 4,880,645 A | | 11/1989 | Carpenter et al. | |
| 5,433,964 A | * | 7/1995 | Norman | B65B 25/001 |
| | | | | 426/303 |
| 5,575,848 A | * | 11/1996 | Chedville | A47J 43/22 |
| | | | | 118/19 |
| 5,755,880 A | * | 5/1998 | Norman | A21C 9/04 |
| | | | | 118/19 |
| 5,876,775 A | | 3/1999 | Behnke et al. | |
| 6,007,859 A | * | 12/1999 | Taylor | A23G 3/26 |
| | | | | 366/147 |
| RE36,554 E | * | 2/2000 | Chedville | A23P 20/12 |
| | | | | 118/19 |
| 8,460,731 B2 | | 6/2013 | Mazin | |
| 10,645,966 B2 | * | 5/2020 | Wettlaufer | A47J 19/02 |
| 10,918,116 B2 | * | 2/2021 | Lapeyrouse | B65D 47/0838 |
| 11,134,712 B2 | * | 10/2021 | Nelson | A23G 3/2076 |
| 11,465,169 B1 | * | 10/2022 | Rosenthal | B05C 19/008 |
| 11,918,022 B2 | * | 3/2024 | Wettlaufer | A23N 1/02 |
| 11,974,593 B2 | * | 5/2024 | Gamble | A23G 3/0095 |
| 2002/0046696 A1 | * | 4/2002 | Lang | A21C 15/002 |
| | | | | 118/13 |
| 2006/0159811 A1 | * | 7/2006 | Cosby | A23G 3/2076 |
| | | | | 426/307 |
| 2008/0241269 A1 | * | 10/2008 | Velasquez | A23L 3/3589 |
| | | | | 424/520 |
| 2009/0162498 A1 | | 6/2009 | McArdle et al. | |
| 2009/0202673 A1 | * | 8/2009 | Phillips | A23G 4/20 |
| | | | | 426/5 |
| 2010/0107971 A1 | * | 5/2010 | Cosby | A23G 3/2092 |
| | | | | 118/24 |
| 2011/0197810 A1 | * | 8/2011 | Fusejima | B05C 3/08 |
| | | | | 118/313 |
| 2013/0071524 A1 | | 3/2013 | Barrett et al. | |
| 2014/0000510 A1 | * | 1/2014 | Fusejima | B05C 5/02 |
| | | | | 118/19 |
| 2015/0289555 A1 | | 10/2015 | Barrett et al. | |
| 2017/0106376 A1 | * | 4/2017 | Quadrana | A23L 13/65 |
| 2017/0188610 A1 | | 7/2017 | Froseth et al. | |
| 2018/0110256 A1 | | 4/2018 | Melonas et al. | |
| 2019/0059437 A1 | * | 2/2019 | Svejkovsky | A23G 3/26 |
| 2021/0386109 A1 | * | 12/2021 | Nelson | A23G 3/26 |

FOREIGN PATENT DOCUMENTS

| | | |
|---|---|---|
| EP | 0632959 A1 | 1/1995 |
| EP | 0923883 A2 | 6/1999 |
| EP | 2361674 A1 | 8/2011 |
| WO | 96/39866 | 12/1996 |
| WO | 2008016940 A1 | 2/2008 |

* cited by examiner

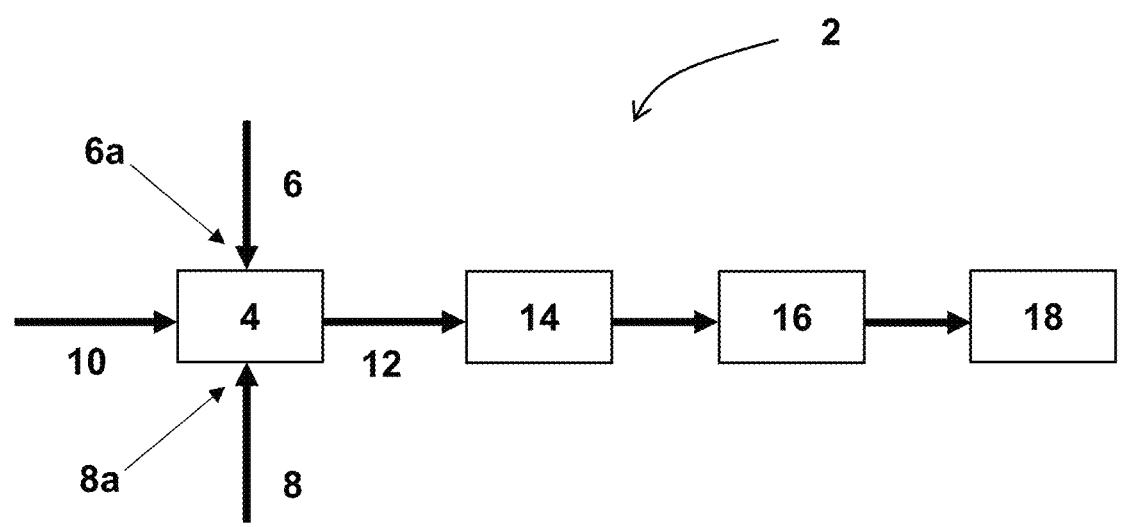

DUAL-SPRAY REDUCED SUGAR COATING SYSTEM AND METHOD

CROSS-REFERENCE TO RELATED APPLICATIONS

This application is a divisional application for U.S. patent application Ser. No. 16/287,014, filed Feb. 27, 2019, which claims the benefit of and priority under 35 U.S.C. § 119 of U.S. Provisional Application No. 62/637,529 filed Mar. 2, 2018. Priority is claimed to these applications and the disclosure of these prior applications is considered part of the disclosure of this application and to the extent allowed the entire contents of the aforementioned applications are incorporated herein.

FIELD

The present disclosure relates generally to a system and method for applying a reduced sugar coating to a food product, and more particularly to a system and method for applying a reduced sugar coating to a food product using separate applications of a non-sucrose carbohydrate syrup and a sucrose syrup.

BACKGROUND

Consumers often desire food products, such as breakfast cereals to suggest an example, that are lower in sugar content while providing many of the same organoleptic characteristics, such as taste, texture, and/or appearance as traditionally-sugared products. Breakfast cereals may include a sugar-based coating or frosting that is often central to the taste, texture, and/or appearance characteristics of the food. When attempting to reduce the level of sugar in the coating, however, simply lowering the sugar content of the coating can be problematic during processing and affect the appearance of the product. Using a reduced sugar content coating within conventional processing equipment, such as a spray drum or other applicator, can result in undesirable clumping of individual cereal pieces.

Additionally, the reduced sugar coatings may also result in undesired texture and/or appearance. Consumer acceptance of foods is often a complex mix of many organoleptic characteristics including taste, mouthfeel, perception, smell, and other objective and subjective factors. For instance, a pleasantly tasting food may not be accepted by consumers if the color or appearance of the food suggests otherwise. Appearance of a frosted or iced product, to suggest another example, may be one of the drivers of sweetness perception and likeness of the product with some consumers. The desired white or opaque coating of frosted products, such as on ready-to-eat (RTE) breakfast-type cereals, may be due in part to a diffraction of light hitting crystalized sugar in the frosting or coating. Thus, while reducing the level of sugar in the coating may be beneficial to consumer demands for lower sugar-content foods, simply lowering the sugar content can be problematic with other likeness factors because of the sugar's role in providing more than just sweetness to the food. Reducing sugar can negatively affect the white, opaque appearance that consumers come to expect in a frosted or iced product due to a decreased level of sugar crystals to provide light detraction. A less white or opaque coating may then negatively affect perception of the product even if the product meets consumer desires for lower sugar content.

SUMMARY

In one aspect of this disclosure, described herein is a process for producing a reduced sugar coated food product with a reduction in food product clumping, the process includes applying a sucrose syrup to discrete food product pieces from a first applicator, applying a non-sucrose carbohydrate syrup to the discrete food product pieces from a second applicator either simultaneously with, spaced from, or sequentially with the sucrose syrup applied from the first applicator. In some aspects, the food product is not actively dried between applying the sucrose syrup and the non-sucrose carbohydrate syrup. A combination of the sucrose syrup and the non-sucrose carbohydrate syrup has a brix of less than 90 (in other approaches, about 60 to about 85, and in yet other approaches, about 60 to about 75) obtained from about 20 to about 50 weight percent sucrose and about 20 to about 50 percent non-sucrose carbohydrates, by weight of the total syrups.

The process of the previous paragraph may include one or more of the following additional features: wherein the non-sucrose carbohydrate syrup includes maltodextrin, corn syrup, glucose syrup, soluble fiber, soluble and insoluble starches, cocoa and its derivatives, natural and artificial flavors, natural and artificial sweeteners, natural and artificial colors, and combinations thereof; and/or wherein the first applicator and second applicator are disposed within a single mixing apparatus; and/or wherein the sucrose syrup is applied at a temperature of about 105 to about 120° C. and the non-sucrose carbohydrate syrup is applied at a temperature of about 50 to about 110° C.; and/or wherein the sucrose syrup is applied at a rate of about 15 to about 65% of the rate of the food product, by weight, and the non-sucrose carbohydrate syrup is applied at a rate of about 15 to about 65% of the rate of the food product, by weight; and/or wherein the temperature of the sucrose syrup is about 10 to about 60° C. higher than a temperature of the non-sucrose carbohydrate syrup; and/or wherein an application ratio of the sucrose syrup to the non-sucrose syrup is about 1:3 to about 3:1.

In another aspect, described herein is a system for producing a reduced sugar coated food product having a reduced amount of food product clumping. The system may include a source of a food product, a coating drum for receiving the food product, the coating drum having a first applicator in a first region and a second applicator in a second region. The first applicator may be fluidly connected to a source of a first syrup and the second applicator is fluidly connected to a source of a second syrup. One of the first syrup and the second syrup is a non-sucrose carbohydrate syrup and the other of the first syrup and the second syrup is a sucrose syrup.

The system of the previous paragraph may include one or more of the following additional features: wherein the non-sucrose carbohydrate syrup includes maltodextrin, corn syrup, glucose syrup, soluble fiber, soluble and insoluble starches, cocoa and its derivatives, natural and artificial flavors, natural and artificial sweeteners, natural and artificial colors, and combinations thereof; and/or wherein the first region is located upstream of the second region relative to the movement of food product through the coating drum; and/or wherein the system is devoid of any active drying mechanisms positioned between the first applicator and the second applicator.

In yet another aspect, described herein is a reduced sugar coated food product comprising a food product base coated with a reduced sugar coating. The reduced sugar coating includes at least a dried non-sucrose carbohydrate syrup and a dried sucrose syrup. The reduced sugar coating has a brix of less than 90 (in other approaches, about 60 to about 85, and in yet other approaches, about 60 to about 75). The reduced sugar coating has a white opaque crystallized appearance. Optionally, the food product base may be a cereal. In some aspects, the reduced sugar coating is applied according to any of the method steps and/or using system features of the previous paragraphs of this summary.

DRAWINGS

The drawings described herein are for illustrative purposes only of selected configurations and not all possible implementations, and are not intended to limit the scope of the present disclosure.

FIG. 1 is a schematic of an example dual spray applicator method or system.

DETAILED DESCRIPTION

Disclosed herein are systems and methods for applying a reduced sugar coating to a comestible, such as a flake, granule, particulate, biscuit, nugget, and the like discrete comestibles or discrete food product pieces, in a manner that reduces and/or eliminates the tendency of product clumping of the discrete pieces during processing. At the same time, the unique systems and methods herein mimic the appearance of a white, crystalized coating on the food product pieces even with reduced levels of sugar. In some approaches, the coatings herein have about 15 to about 75% less sugar than traditional coatings on frosted type cereals. One example of the methods and systems herein relates to reduced sugar coatings for a flaked food product (such as a frosted flaked cereal) to achieve minimal to no product clumping during manufacturing and to achieve a white, opaque crystalized-type coating on the outer surfaces of the flaked food consistent with prior, traditional coated cereals. However, the methods and compositions herein may also be applied to other coated foods as needed for a particular application.

As discussed more below, a process for producing a reduced sugar coated food product with a reduction in food product clumping is described herein. It was unexpectedly discovered that separating a reduced sugar coating solution into two separate solutions dramatically dropped the instances of product clumping during processing as compared to a single, reduced-sugar coating application that contained the same components as the two separate solutions. At the same time, the selected two coating solutions, when recombined during application, provide a white crystalized coating that mimics the appearance of a traditional sugar coating that consumers tend to expect on a frosted breakfast cereal or other coated food item. The white, opaque appearance was unexpectedly achieved when applying two separate solutions and was not achievable when applying the same reduced, sugar components in a single solution. In one aspect, the methods include applying to discrete food product pieces a non-sucrose carbohydrate syrup from a first applicator and then or simultaneously applying a sucrose syrup to the food product from a second applicator. In either case, there is no active drying between the applications of each syrup.

Turning to more of the specifics, FIG. 1 shows a schematic for a process and/or system 2 for producing a reduced sugar coated food product with a reduction in food product clumping during processing. In process or system 2, a coating device or chamber 4 receives at least two separate feeds of a first syrup 6 (such as, a reduced-sugar syrup) provided by an applicator 6a and a second syrup 8 (such as, a non-sucrose carbohydrate syrup) provided by an applicator 8a. The separate syrup feeds are provided to separate injectors, spray nozzles, and the like (not shown in FIG. 1) within the coating drum 4 arranged and configured to apply the respective solutions to the food product pieces either tumbled in or passing through the device 4. The first syrup 6 may be fed to a first applicator 6a (such as a spray nozzle), in some instances, proximal to an inlet of the coating drum 4 and the second syrup 8 may be applied through a separate, second applicator 8a (such as a spray nozzle) spaced from or distal to the coating drum inlet. Alternatively, the second syrup 8 may be fed to the applicator proximal to the inlet of the coating drum 4 and first syrup 6 to the second applicator spaced from or distal to the coating drum inlet.

A source of food product to be coated 10 (e.g., flake, crumb, particulate, granule, biscuit, nugget, or the like cereal-type product) is fed to the coating drum 4 and then the first and second syrups 6 and 8 are applied to the food therein in either a simultaneous and/or sequential manner (from the two spaced applicators) to form a now combined, partially combined, and/or layered coating (or combinations thereof) on the discrete food product piece(s). There is no active drying, such as air heating, inductive heating, heating coils, or any other type of active heating, applied to the coating drum and to the product therein before, during, or between the application of the first and second syrups 6 and 8.

Next, the coated food product 12 is transferred to a drying unit 14, such as a multi-stage or multi-pass dryer, to dry the applied syrup coating(s) on the food product. Optionally, the dried product may then be sent to a cooler 16 and then processed in a manner for packing 18 suitable or typical for the particular product being manufactured.

The combined first and second syrups 6 and 8, when applied to the food product 10, provide a coating thereon when dried and recombined having a reduced level of sugar and a white, opaque and crystalized appearance. The combined coating of 6 and 8 have a reduced level of sugar compared to prior products, such as about 15 to about 75% less sucrose or other sugars. In another aspect, the re-combined two coating solutions, even with less sugar, still exhibits a brix value of less than about 90, in other approaches, about 60 to about 85, in other approaches, about 60 to about 75, and in yet further approaches, about 70 to about 85.

Sugar Syrup: In one aspect, the first syrup 6 is a sucrose or sugar syrup and includes about 60 to about 90 weight percent sugar in water or other liquid. (In other approaches, about 70 to about 85 weight percent sugar, and in yet other approaches, about 77 to about 83 weight percent sugar in water or other liquid, and in yet other approaches, about 50 to about 70 percent sugar) The syrup may have about 10 to about 50 percent water, in other approaches, about 15 to about 25 percent water, and in yet other approaches, about 20 to about 40 percent water.

The first syrup 6 may optionally include other flavors and additives, including cocoa and its derivatives, soluble and insoluble starches, natural and artificial flavors, natural and artificial sweeteners, natural and artificial colors, and mixtures thereof. If included, these optional flavors and other additives may be provided in amounts of no more than about 30 weight percent and, in some instances, less than about 1 percent or about 1 to about 10 weight percent.

In some approaches, the first, sugar syrup 6 individually may be a sugar syrup designed to provide a reduced sugar content to the combined coating (that is, when combined with syrup 8) and having a reduced sugar content compared to a traditional syrup, such as a brix below about 90, and in other approaches, a brix value of about 70 to about 85, and in yet other approaches, a brix value of about 77 to about 83. It is targeted that this sucrose syrup 6 is applied at a rate of about 15% to about 65% the rate of substrate (by weight) and at a solution temperature of about 105 to about 120° C.

Non-sucrose Carbohydrate-based Syrup: In another aspect, the second syrup 8 is a non-sucrose containing carbohydrate-based syrup including one or more non-sugar bulking agents selected form maltodextrin, corn syrup, glucose syrup, soluble fibers, soluble and insoluble starches, cocoa and its derivatives, natural and artificial flavors, natural and artificial sweeteners, natural and artificial colors, and combinations thereof. One example of a reduced sugar corn syrup is VeraSyra® reduced sugar corn syrup (Cargill). Another example of a reduced sugar glucose syrup is C Sweet™ glucose syrup (Cargill). This second syrup 8 is substantially free of sucrose and, thus, the systems and methods herein separate a coating solution into two distinct solutions wherein the sugar/sucrose is applied in a first syrup and a second, non-sucrose containing syrup is provided to separately deliver the non-sucrose carbohydrate components to the food product pieces either simultaneously, sequentially, and/or physically spaced from the first syrup. It is was surprisingly discovered that by separating a single coating into two separate solutions that are applied either sequentially, simultaneously, and/or spaced apart to a food that clumping of the individual or discrete food product pieces during processing can be minimized and substantially avoided. At the same time, the resultant coating, even with reduced levels of sugar, tend to mimic the white, opaque appearance of a traditional coating.

In some approaches of this aspect, the second syrup 8 may include about 50 to about 90 weight percent of the non-sugar bulking agent and, in other approaches, about 50 to about 80, and, in yet other approaches, about 65 to about 75 weight percent of the non-sugar bulking agents. Preferably, the non-sugar bulking agent may be adjusted on a weight percent basis to account for overall system limitations—such limitations include viscosity, pressure, temperature, and/or drying capacity. The second syrup 8 may optionally include other flavors and additives, including chocolate flavors, cocoa powder, chocolate liquor, soluble and insoluble starches, cocoa and its derivatives, natural and artificial flavors, natural and artificial sweeteners, natural and artificial colors and mixtures thereof. If included, these optional flavors and other additives may be provided in amounts of no more than about 40 weight percent and, in some instances, no more than about 30 weight percent, and in some instances, less than about 1 percent, or about 1 to about 10 weight percent. The second, non-sucrose carbohydrate based syrup 8 may also include less than about 50 percent water, such as about 20 to about 50 percent water, in other approaches, about 25 to about 35 percent water, and in other approaches, about 1 to about 20 percent water.

The second, non-sucrose, carbohydrate-based syrup 8 individually is applied at a rate of about 15% to about 65% the rate of substrate (by weight) and at a temperature of about 50 to about 110° C.

In some approaches, selected non-sucrose bulking agents have a dextrose equivalent or DE of about 5 to about 30 and, in other approaches, about 10 to about 20.

As used herein, non-sucrose or substantially free of sucrose, for instance, in the second syrup 8 generally means less than about 0.5 percent sucrose, in other cases, less than about 0.2 weight percent sucrose, in yet further cases, less than about 0.1 weight percent sucrose, and in yet other cases, no sucrose.

The spray of the first and second syrup to the substrate forms a coating on the surface of the substrate. The coating has random areas of mixed, unmixed, and/or partially mixed first and second applied syrups on the various surfaces of the substrate food piece(s). For example, there may be some areas on a substrate with higher sugar concentration (mostly sugar syrup), some areas of high non-sugar bulking concentration (mostly non-sugar carbohydrate syrup), and some areas with more even mixing of the two syrups. Individual substrate pieces may also vary in terms of the ratio of the syrups and the degree of mixing. On the whole, limited mixing of the two syrups is expected due to the tumbling action in the coating drum apparatus. Areas of higher sugar concentration and areas of higher non-sugar bulking concentration were observed, suggesting limited mixing on the coated products.

In some approaches, various process conditions can be selected to help aid in achieving low clumping and good coating appearance of the discrete food pieces herein when separating a single coating into two separate coatings. In some approaches, rates of discrete food product or pieces through the apparatus, application rates of the syrups relative to each other, as well as relative temperatures of the syrups can be selected to achieve the desired coating thickness and quality of the reduced sugar coating. Additionally, a desired ratio of the two syrups as well as the desired overall brix of the coating may be selected to achieve a white, opaque coating with minimal product clumping. In another aspect, therefore, the methods and systems herein apply the first and second syrup 6 and 8 at relative temperatures so that the temperature of the sucrose syrup 6 is about 10 to about 60° C. higher than a temperature of the non-sucrose carbohydrate syrup 8. In other instances, an application ratio of the sucrose syrup 6 to the non-sucrose syrup 8 is about 1:2 to about 3:1, and in other approaches, about 1:2 to about 1:1, and in yet other approaches, about 2:1 to about 3:1.

As noted above, it was quite unexpected that separating the individual ingredients of a coating syrup into two separate solutions and then spraying those solutions sequentially, simultaneously, or physically spaced apart onto a food product to form a single coating on the food (as described above) would result in reduced levels of clumping of food pieces as compared to spraying the same components and amounts as a single solution. Without wishing to be limited by theory, it is believed that when a reduced-sugar coating is applied as a single solution, there are cohesive and adhesive forces of the solution when applied to discrete food pieces. It is believed that in the context of a single coating solution that these cohesive and adhesive forces of the solution tend to allow the coating to stick to the food piece and also to adjacent food pieces to a high degree. When a coated food piece comes into contact with an adjacent coated food piece coating with a single solution, the cohesive forces (that is, syrup to syrup binding) are greater than or equal to the adhesive forces (that is, syrup to product binding). In this circumstance, product clumping tends to be enhanced and the discrete pieces of coated product are stuck together when processed in a coating drum or other coating apparatus.

Again, without wishing to be limited by theory, when the coating solutions are separated and applied sequentially and/or simultaneously without active drying as in the present disclosure, product clumping is dramatically reduced. In this context, it is believed that when the solutions are separated, it is possible that the dynamic binding forces of the coating and product are altered so that the cohesive forces (again, syrup to syrup binding) is now less than the adhesive forces (syrup to product binding), which tends to result in lower clumping. This effect is completely unexpected because the separate solutions have the same components and in the same amounts as the single solution, but when separated into differently applied solutions result in distinctly lower level of product clumping.

As discussed above, the second syrup 8 is applied separately (i.e., via a separate applicator) from the reduced sugar syrup 6, but with no active drying step in between the applications. For example, the reduced sugar syrup 6 and second syrup 8 may be applied within a single apparatus 4 (e.g., a coating drum). After applying each individual syrup 6 and 8 with no active drying, the syrups 6 and 8 are combined as a single coating on the food product surface. A single reduced sugar coating is then formed on the surface of the food product from the two combined coatings. The reduced sugar coating comprises a combination of the first syrup (reduced sugar syrup) 6 and the second syrup 8. The combined total reduced sugar coating may have a brix less than about 90 (e.g., from about 70 to about 85 or about 60 to about 75). The reduced sugar coating may have a crystallized appearance. The crystallized appearance may be a white and/or opaque crystalline appearance. This white and/or opaque crystalline appearance may be distinguishable from a clear-coated appearance.

When combined, the total coating solution from the two separate syrups may have in total about 20 to about 50 percent sugar (in other approaches, about 20 to about 35 percent sugar); about 20 to about 50 percent non-sugar bulking agent (in other approaches, about 35 to about 50 percent non-sugar bulking agent); about 20 to about 50 percent water (in other approaches, about 15 to about 30 percent water); and about 0 to about 40 percent other flavors, additives (cocoa, chocolate, salt, flavors, rice, etc. and other added ingredients).

In one approach, the food products are coated with the two separate coating solutions/syrups via two separate or dual spray nozzles. In some embodiments, the food product is a cereal such as a flake, biscuit, granule, particulate, nugget, or other type of cereal with discrete food product pieces. For example, the food product may be a flake cereal (e.g., corn flakes) or a crisped rice cereal.

During processing with the unique dual application of separate solutions with no active drying, the reduced sugar-coated food products may have little or no clumping. Clumping refers to multiple discrete pieces of the food product (e.g., flakes of a flake cereal) sticking together to form a mass that is not readily broken apart by normal processing and handling of the food product. In particular, the reduced sugar-coated food products made using the dual spray process described herein may have reduced clumping as compared to a single spray process where all coating ingredients are applied as a single application of a single syrup (having both a reduced sugar syrup component and a second (e.g. sucrose) syrup component).

The syrups can be applied to the food product using any suitable applicator. One suitable apparatus is a coating drum 4 having at least two applicators therein, which are preferably two spaced spray nozzles. The coating drum may be outfitted with a first sprayer and a second sprayer, connected to a first syrup source and second syrup source, respectively. The sprayers may be positioned with the first sprayer proximal to the inlet to the coating drum and the second sprayer distal to the inlet of the coating drum, so as to sequentially spray the syrups onto the food product within a spatial arrangement in the coating drum (spray nozzles may be simultaneously spraying, but from their spaced apart positions). Alternatively, the sprayers may be positioned at the same or close to the same position along the length of the coating drum so as to simultaneously spray the syrups onto the food product. Additional process equipment may include dryers, coolers, conveyors, packing equipment, pumps, heaters, heat exchangers, storage tanks, etc. Nonetheless, even if the applicators are spaced apart within a coating drum, the applicators are preferably applying their respective solutions at the same time, but due to the spatial arrangement that application may be sequentially applied to the individual food product pieces as they are moved through the coating drum.

The coating drum may comprise a rotary tumbler with length and diameter calculated to accommodate the product flow. The rotary tumbler may have baffles inside to enhance the tumbling action. The rotation speed and tumbler tilt angle may be adjusted to achieve the required friction and residence time. The applicators (e.g., sprayers) in the apparatus (e.g., coating drum) may comprise multiple applicators spread out along the length and/or width of the apparatus.

The practice and advantages of the disclosed embodiments may be demonstrated by the following Examples, which are presented for purposes of illustration and not limitation. Unless indicated otherwise, all amounts, percentages, and ratios of this disclosure are by weight.

EXAMPLES

Comparative Example 1

This Comparative Example evaluates a process of applying a single reduced-sugar syrup to a crisped rice cereal using a single spray nozzle. Comparative syrup C1.1 was prepared as shown in Table 1 as a single solution or syrup.

TABLE 1

| Syrup C1.1 | | |
|---|---|---|
| Ingredient | Amount (lbs) | %, wt |
| Water | 115 | 20.5% |
| Sugar (fine granulated) | 150 | 26.8% |
| Cocoa | 44.1 | 7.9% |
| Chocolate Liquor | 12.6 | 2.2% |
| Glucose syrup | 239 | 42.6% |

Comparative Syrup C1.1 having the composition of Table 1 above was sprayed to a substrate (crisped rice cereal) using a spray system within a small scale coating drum at a rate of about 2.85 lb/min of syrup for every 5.5 lb/min of substrate. Comparative Syrup C1.1 was a single composition comprising water, sugar, and a non-sucrose, carbohydrate-based syrup ("glucose syrup" in Table 1) in one solution. This solution was considered a reduced sugar syrup because it included about 26.8% sugar, which is about 50% less than a traditional syrup for this type of cereal. The syrup was applied via a single spray. Comparative Syrup C1.1 had a brix of about 67 and was applied at a solution temperature of about 185° F.

Upon drying the product to about 3% moisture content, large blocks (clumps) of coated cereal pieces (reduced sugar coated crisped rice cereal) were observed. The blocks measured about 10 inches wide by about 4 inches tall by about 8 inches long. These large blocks did not readily break apart upon dropping from a discharge of the dryer/cooler in the process.

Example 1

The single syrup of Comparative Example 1 was split into the two, inventive separate syrups of Table 2—a sucrose syrup and a non-sucrose carbohydrate-based syrup so that when sprayed on to the product, the combined two syrups provided the same composition as the single syrup of Comparative Example 1 (but obtained from two separate syrups and two separate spray heads). The syrups were applied to the same food as Comparative Example 1 and using the same spray nozzle and apparatus, except that two separate spray nozzles were utilized—one for each syrup. The syrups were applied simultaneously while the drum rotated.

TABLE 2

Syrups 1.1 and 1.2

| Ingredient | Amount (lbs) | % by weight (individual solutions) | %, by weight (combined solutions) |
|---|---|---|---|
| Sucrose Syrup | | | |
| Water | 75 | 33.3% | 20.5% |
| Sugar (fine granulated) | 150 | 66.7% | 26.8% |
| Non-Sucrose Carbohydrate-Based Syrup | | | |
| Water | 40 | 11.9% | (included in water % above) |
| Cocoa | 44.1 | 13.1% | 7.9% |
| Chocolate Liquor | 12.6 | 3.8% | 2.2% |
| Glucose syrup | 239 | 71.2% | 42.6% |

The sucrose syrup of Table 2 was mixed to about 67% solids and then heated to concentrate to about 82% solids. The non-sucrose carbohydrate-based syrup of Table 2 contained reduced sugar corn syrup (glucose syrup in Table 2) and the other ingredients consistent with Comparative Example 1. The syrups were applied to about 5.5 lbs/min of crisped rice cereal at rate of about 0.94 lb/min for the sucrose syrup and about 1.71 lb/min for the non-sucrose carbohydrate-based syrup. The syrups were applied via separate spray nozzles. The sucrose syrup was applied first and the non-sucrose carbohydrate-based syrup was applied second. The first and second applications refer to the position within the drum—where first would be at the location closer to the rice/substrate entrance and second would be at a location closer to the drum exit. The sucrose syrup had a brix of about 80 and was applied at syrup temperature of about 230° F. The non-sucrose carbohydrate-based syrup had a solids concentration of about 67 percent and was applied at a syrup temperature of about 185° F.

Upon drying the product to about 3% moisture, it was observed that mostly free flowing coated cereal pieces were formed (reduced sugar coated crisped rice cereal) and there were only occasional small lumps (about 3 inches in diameter). The occasional small lumps readily broke apart in subsequent handling of the product via conveyors.

The syrups were then applied under the same conditions but in reverse order with the non-sucrose carbohydrate-based syrup applied first. This also resulted in free flowing product with only occasional small lumps that readily broke apart.

Example 2

Another Example was performed of an inventive dual spray, reduced sugar coated crisped rice cereal using the two separate syrups of Table 3.

TABLE 3

Syrups 2.1 and 2.2

| Ingredient | Amount (lbs) | % by weight (individual solutions) | % by weight (combined solutions) |
|---|---|---|---|
| Sucrose Syrup | | | |
| Water | 75 | 30.3% | 17.6% |
| Sugar (fine granulated) | 150 | 62.5% | 27.7% |
| Cocoa | 22.05 | 9.2% | 8.2% |
| Non-sucrose Carbohydrate-based Syrup | | | |
| Water | 20 | 6.8% | (included in above) |
| Cocoa | 22.05 | 7.5% | (included in above) |
| Chocolate Liquor | 12.6 | 4.3% | 2.3% |
| Glucose syrup | 239 | 81.4% | 44.2% |

In this formulation, the cocoa was split between the two syrups, the sucrose syrup and the non-sucrose carbohydrate-based syrup, and the amount of water in the reduced sugar syrup was reduced compared to Example 1. The two syrups were applied to a crisped rice cereal as described in Example 1 through separate spray nozzles to about 5.5 lbs/min of crisped rice cereal at a rate of about 1.25 lbs/min for the sucrose syrup and about 1.49 lbs/min for the non-sucrose carbohydrate-based syrup. The syrups were applied via separate sprays. The sucrose syrup was applied first, and the non-sucrose carbohydrate syrup was applied second. The sucrose syrup had a brix of about 67 and was applied at a solution temperature of about 180° F. The non-sucrose carbohydrate syrup had a solids concentration of about 67 percent and was applied a solution temperature of about 185° F.

Similar to Example 1, upon drying the product to about 3% moisture, mostly free flowing finished product (reduced sugar coated crisped rice cereal) was observed with only occasional small lumps (about 3 inches in diameter). The occasional small lumps readily broke apart in subsequent handling of the product via conveyors. Compared to Example 1, the product appeared darker, which may be attributable to splitting the cocoa powder into two separate spray applications.

The two syrups were then applied under the same conditions but in reverse order with the non-sucrose carbohydrate syrup applied first. This also resulted in free flowing product with only occasional small lumps that readily broke apart. A darker color (compared to Example 1) was again observed.

Comparative Example 2

Another single solution, comparative example was performed following the formulation in Table 4 below. The solution was applied to corn flakes.

TABLE 4

| Ingredient | Amount (lbs) | % by weight |
|---|---|---|
| Water | 100 | 24.8% |
| Maltodextrin (Dry 5DE) | 100 | 24.8% |
| Rice hull fiber | 3.5 | 0.9% |

TABLE 4-continued

| Ingredient | Amount (lbs) | % by weight |
|---|---|---|
| Sugar (fine granulated) | 200 | 49.6% |
| Salt (granulated, SI) | 0.25 | <1% |

The comparative syrup of Table 4 was applied to corn flakes at a rate of about 1.8 lb/min for every about 6 lb/min of corn flakes. The comparative syrup of Table 4 was applied through a single spray nozzle and was a single composition including water and a non-sucrose, carbohydrate-based syrup (maltodextrin). The syrup had a brix of about 72 and was applied at a solution temperature of about 140° F.

Upon drying the product to about 3% moisture, hard clumps were again observed in the finished product (reduced sugar coated corn flakes). The clumps measured about 4 inches in diameter and did not readily break apart upon dropping from the discharge of the dryer/cooler or during subsequent handling of the product. The coated product also had a clear coated appearance and did not resemble a traditional white coated corn flake.

Example 3

Another inventive, dual spray, reduced sugar coated corn flake cereal was prepared by applying two syrups to the corn flakes as shown in Table 5 below.

TABLE 5

Syrups 3.1 and 3.2

| Ingredient | Amount (lbs) | % by weight (individual solutions) | % by weight (combined solutions) |
|---|---|---|---|
| Non-sucrose Carbohydrate Syrup | | | |
| Water | 120 | 28.1% | 30.7% |
| Maltodextrin | 300 | 70.6% | 34.2% |
| Rice hull fiber | 7 | 1.6% | 0.8% |
| Sucrose Syrup | | | |
| Water | 150 | 33.3% | (included in above) |
| Sugar (fine granulated) | 300 | 66.6% | 34.1% |
| Salt (granulated, SI) | 0.5 | <1% | <1% |

The non-sucrose carbohydrate syrup was applied to 6.0 lb/min of corn flakes at the rate of 1 lb/min of syrup and the sucrose syrup was applied to about 6 lb/min of the corn flakes at the rate of 0.93 lb/min of syrup. The non-sucrose carbohydrate based syrup had a solids concentration of about 61 percent and was applied at a solution temperature of about 165° F. The sucrose syrup had a brix of 82 and was applied at a solution temperature of about 232° F.

Upon drying the product to about 3% moisture, mostly free flowing finished product (reduced sugar coated corn flakes) was observed with only occasional small lumps/clusters (consisting of 3 or 4 flakes) which readily broke apart in subsequent handling of the product.

A modified formulation with no rice hull fiber also resulted in free flowing product with only occasional small lumps/clusters (consisting of 3 or 4 flakes) which readily broke apart in subsequent handling of the product. The product of this Example and the modified formulation both had a white opaque crystalline coated appearance.

Example configurations are provided above so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A system for producing a reduced sugar coated food product having a reduced amount of food product clumping, the system comprising:

a source of a food product, a first syrup, and a second syrup;

a coating drum for receiving the food product, the coating drum having a first applicator in a first region and a second applicator in a second region;

wherein the first applicator is fluidly connected to a source of the first syrup and the second applicator is fluidly connected to a source of the second syrup;

wherein one of the first syrup and the second syrup is a non-sucrose carbohydrate syrup and the other of the first syrup and the second syrup is a sucrose syrup; and wherein a combination of the sucrose syrup and the non-sucrose carbohydrate syrup has a brix of about 60 to about 90 obtained from about 20 to about 50 weight percent sucrose and about 20 to about 50 percent non-sucrose carbohydrates, by weight of the total syrups combined.

2. The system of claim 1, wherein the non-sucrose carbohydrate syrup includes maltodextrin, corn syrup, glucose syrup, soluble fiber, soluble and insoluble starches, cocoa and its derivatives, natural and artificial flavors, natural and artificial sweeteners, natural and artificial colors, and combinations thereof.

3. The system of claim 1, wherein the first region is located upstream of the second region relative to movement of food product through the coating drum.

4. The system of claim 1, wherein the system is devoid of any active drying mechanisms positioned between the first applicator and the second applicator.

5. The system of claim 1, wherein the sucrose syrup is applied at a temperature of about 105 to about 120° C. and the non-sucrose carbohydrate syrup is applied at a temperature of about 50 to about 110° C.

6. The system of claim 1, wherein the sucrose syrup is applied at a rate of about 15 to about 65% of the rate of the food product, by weight, and the non-sucrose carbohydrate syrup is applied at a rate of about 15 to about 65% of the rate of the food product, by weight.

7. The system of claim 1, wherein a temperature of the sucrose syrup is about 10 to about 60° C. higher than a temperature of the non-sucrose carbohydrate syrup.

\* \* \* \* \*